(12) United States Patent
Leppert

(10) Patent No.: US 10,973,372 B2
(45) Date of Patent: Apr. 13, 2021

(54) BLENDER JAR WITH INSERT AND BLENDER JAR INSERT

(71) Applicant: Hamilton Beach Brands, Inc., Glen Allen, VA (US)

(72) Inventor: Kevin L Leppert, Lanexa, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 232 days.

(21) Appl. No.: 16/046,550

(22) Filed: Jul. 26, 2018

(65) Prior Publication Data

US 2020/0029740 A1 Jan. 30, 2020

(51) Int. Cl.
| | |
|---|---|
| *A47J 43/046* | (2006.01) |
| *A23N 1/02* | (2006.01) |
| *A47J 43/07* | (2006.01) |
| *A47J 31/18* | (2006.01) |

(52) U.S. Cl.
CPC .......... *A47J 43/0716* (2013.01); *A23N 1/02* (2013.01); *A47J 31/18* (2013.01); *A47J 43/046* (2013.01)

(58) Field of Classification Search
CPC .......... A47J 43/046; A47J 43/04; A23N 1/02
USPC ............... 99/510, 513, 297; 366/205, 206
See application file for complete search history.

(56) References Cited

U.S. PATENT DOCUMENTS

| | | | | |
|---|---|---|---|---|
| 2,785,547 A | * | 3/1957 | Barros ................... | A23G 9/045 241/65 |
| 4,691,870 A | * | 9/1987 | Fukunaga ............ | A47J 43/046 241/282.2 |
| 8,316,762 B2 | * | 11/2012 | Peng ....................... | A47J 19/02 241/37.5 |
| 2003/0099154 A1 | * | 5/2003 | Daniels, Jr. ......... | A47J 43/0722 366/191 |
| 2006/0018189 A1 | * | 1/2006 | Chang Chien ...... | A47J 43/0727 366/205 |
| 2015/0272394 A1 | * | 10/2015 | Lin .................... | B01F 15/00779 366/314 |
| 2016/0045073 A1 | * | 2/2016 | Kozlowski ............ | A47J 43/046 366/182.1 |

OTHER PUBLICATIONS www.amazon.com/Hamilton-Beach-Blender-Fresca-Strainer/dp/B003FVT36I.
www.blendermate.com/.
www.sears.com/black-decker-bl1350dp-p-infuser-3-in-1-digital/p-A028302429?sid=IDx01192011x1585142620sid=IDx01192011x000001x1585142620&utm_campaign=9058761&utm_group=58788575654-297588726658&utm_term=pla-533483194943&gclid=EAIaIQobChMI3PWtzuXq3QIVAVmGCh0tdwJUEAQYAyABEg-LkFvD_BwE.

* cited by examiner

*Primary Examiner* — Reginald Alexander
(74) *Attorney, Agent, or Firm* — Alexander D. Raring

(57) ABSTRACT

A blender jar comprises a container portion defining a blending chamber and having an open top end, a lid for selectively closing off the open top end of the container portion, one or more selectively rotatable blades extending into the blending chamber, and an insert selectively insertable into the blending chamber. The insert comprises a tubular central body having (i) a side wall defining a central chamber and an open top end and (ii) a floor at least partially closing off a bottom end of the central body, a flange projecting circumferentially outward from the central body, and a plurality of fins projecting outward the lower portion of the central body. One or both of the floor and a lower portion of the central body having a plurality of holes defined therein.

20 Claims, 12 Drawing Sheets

BLENDER JAR WITH INSERT AND BLENDER JAR INSERT

The present disclosure relates generally to small appliances, and more particularly to blenders for blending foodstuff.

Blenders are a household appliance capable of mixing liquids and chopping dry foods. Blenders are also useful for liquefying fruits and vegetables and for blending solids with liquids. A typical blender includes a blender jar that sits on top of a blender base that encloses a motor. The bottom of the blender jar has a blending tool (such as one or more blades) that is rotatably engageable with a drive shaft of the motor in an operating configuration. The blender jar has an open top end that is selectively closed off with a lid. Blender lids often have a removable center portion called a cap. The cap is selectively removable to reveal a smaller opening through which additional foodstuff may be added during the blending process. Foodstuff is placed into the container, the lid is mounted on the blender jar, and the blender jar is engaged with the blender base. The foodstuff is blended within the volume defined by the blender jar, and the blender jar is removed from the blender base to dispense or pour the blended foodstuff.

It is known to use blenders to make popular tea drinks by placing a tea bag the blender jar with hot water. The blender motor is activated which rotates an agitator (typically rather than blades) that is positioned below a basket. The agitated water steeps the tea. Some popular tea drinks then require the tea to be blended with ice and/or other ingredients. Because the blender in which the tea is steeped typically has an agitator rather than blades, the steeped tea must be transferred to a second blender that has blades for the next blending steps.

It has heretofore not been discovered how to create a blender with the ability to rapidly steep tea and then to easily transition to a blending operation. The blender of the following disclosure overcomes at least one of the above-described disadvantages of conventional blenders.

BRIEF SUMMARY OF THE DISCLOSURE

A blender jar with an insert is disclosed herein. In one embodiment of the subject device, a blender jar comprises a container portion defining a blending chamber and having an open top end, a lid for selectively closing off the open top end of the container portion, one or more selectively rotatable blades extending into the blending chamber, and an insert selectively insertable into the blending chamber. The insert comprises a tubular central body having (i) a side wall defining a central chamber and an open top end and (ii) a floor at least partially closing off a bottom end of the central body, a flange projecting circumferentially outward from the central body, and a plurality of fins projecting outward from a lower portion of the central body. One or both of the floor and the lower portion of the central body having a plurality of holes defined therein.

An outer edge of the flange may have a profile that corresponds to a profile of a corresponding portion of an inner surface of the container portion. The outer edge of the flange may be adapted to be in contact with the corresponding portion of the inner surface of the container portion when the insert is inserted into the container portion. A size of the flange may be selected such that the contact between the outer edge of the flange and the inner surface of the container portion enables the insert to be supported above the blades.

A profile of an outer end of each of the plurality of fins may correspond to a profile of a corresponding portion of an inner surface of the container portion. The outer edge of each of the plurality of fins may be adapted to be in contact with the corresponding portion of the inner surface of the container portion when the insert is inserted in the container portion.

A top end of each fin may abut an underside of the flange.

Each fin may project outward from the lower portion of the central body at an angle such that liquid circulating in the container portion when the blades are selectively rotating is directed toward the lower portion of the central body.

The lower portion of the central body may comprise a plurality of scooped projections. Each projection at least partially defines an opening into the central chamber. Each projection is positioned such that liquid circulating in the container portion when the blades are selectively rotating is directed into each respective opening.

The flange may curve downward from the central body toward an inner surface of the container portion.

The central body may be selectively separable from the flange and the plurality of fins.

An upper end of the central body may be selectively engageable with the lid such that the insert is supported above the blades by the lid.

In alternative embodiments of the present disclosure, a blender jar insert comprises a tubular central body having (i) a side wall defining a central chamber and an open top end and (ii) a floor at least partially closing off a bottom end of the central body, a flange projecting circumferentially outward from the central body, and a plurality of fins projecting outward from a lower portion of the central body. One or both of the floor and the lower portion of the central body having a plurality of holes defined therein.

In further alternative embodiments of the invention, a blender comprises a base enclosing a motor, a blender jar as described above being removably mountable to the base in an operating configuration, and a blender jar insert as described above.

In yet further alternative embodiments of the present disclosure, a method of operating a blender comprises putting a blender jar insert as described above into a blender jar as described above, putting a desired amount of an infusible foodstuff into the lower portion of the central body of the insert, putting a desired amount of water into the blender jar, and activating a motor of the blender for a desired amount of time. The method may further comprise removing the insert from the blender jar after the desired amount of activation time, adding a desired amount of another foodstuff and/or ice into the blender jar, and again activating the blender motor for a desired amount of time.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings.

DETAILED DESCRIPTION OF THE DISCLOSURE

Figure 1:
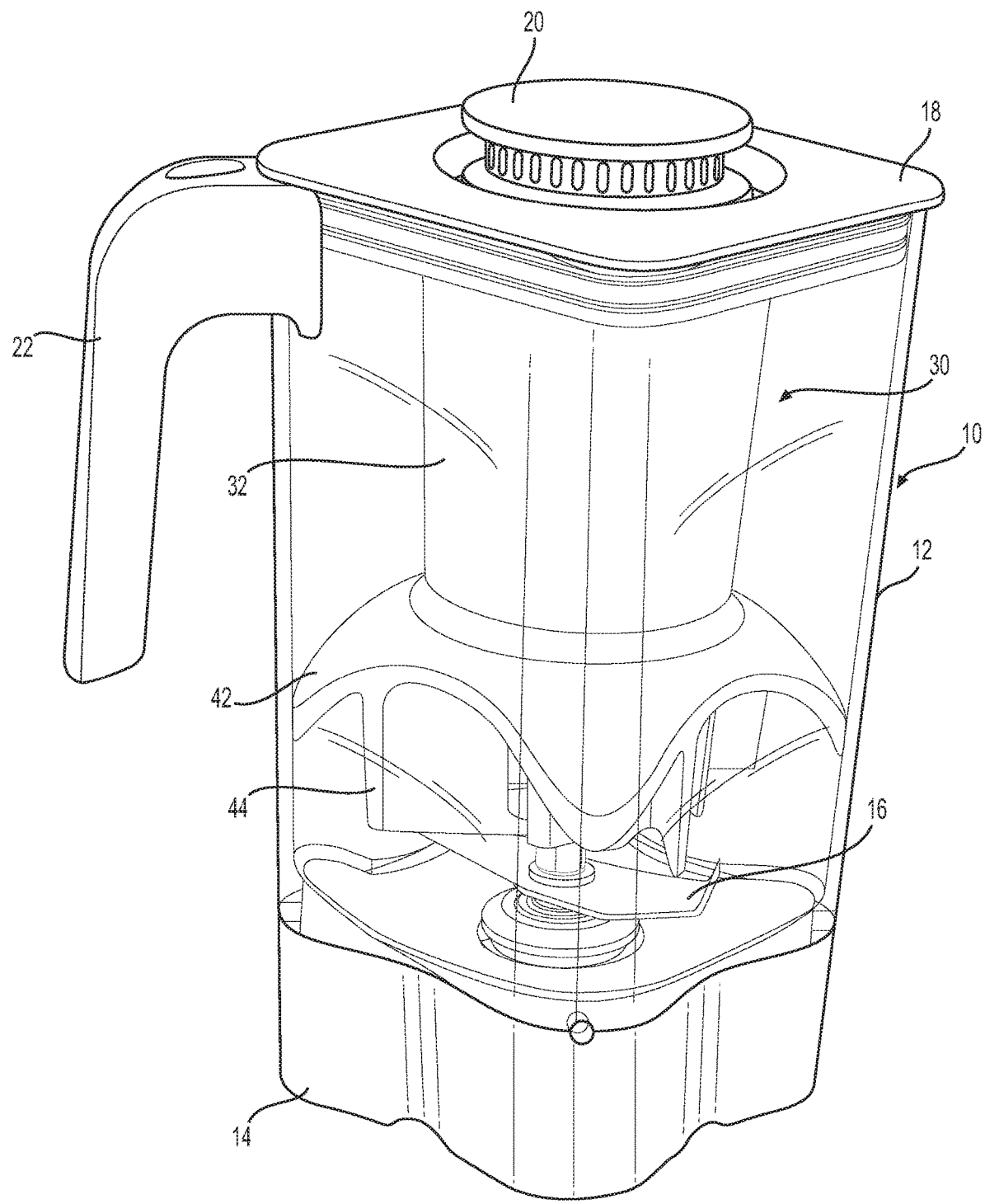
FIG. 1 is a top perspective view of a blender jar with insert, according to one embodiment of the present disclosure.
Figure 2:
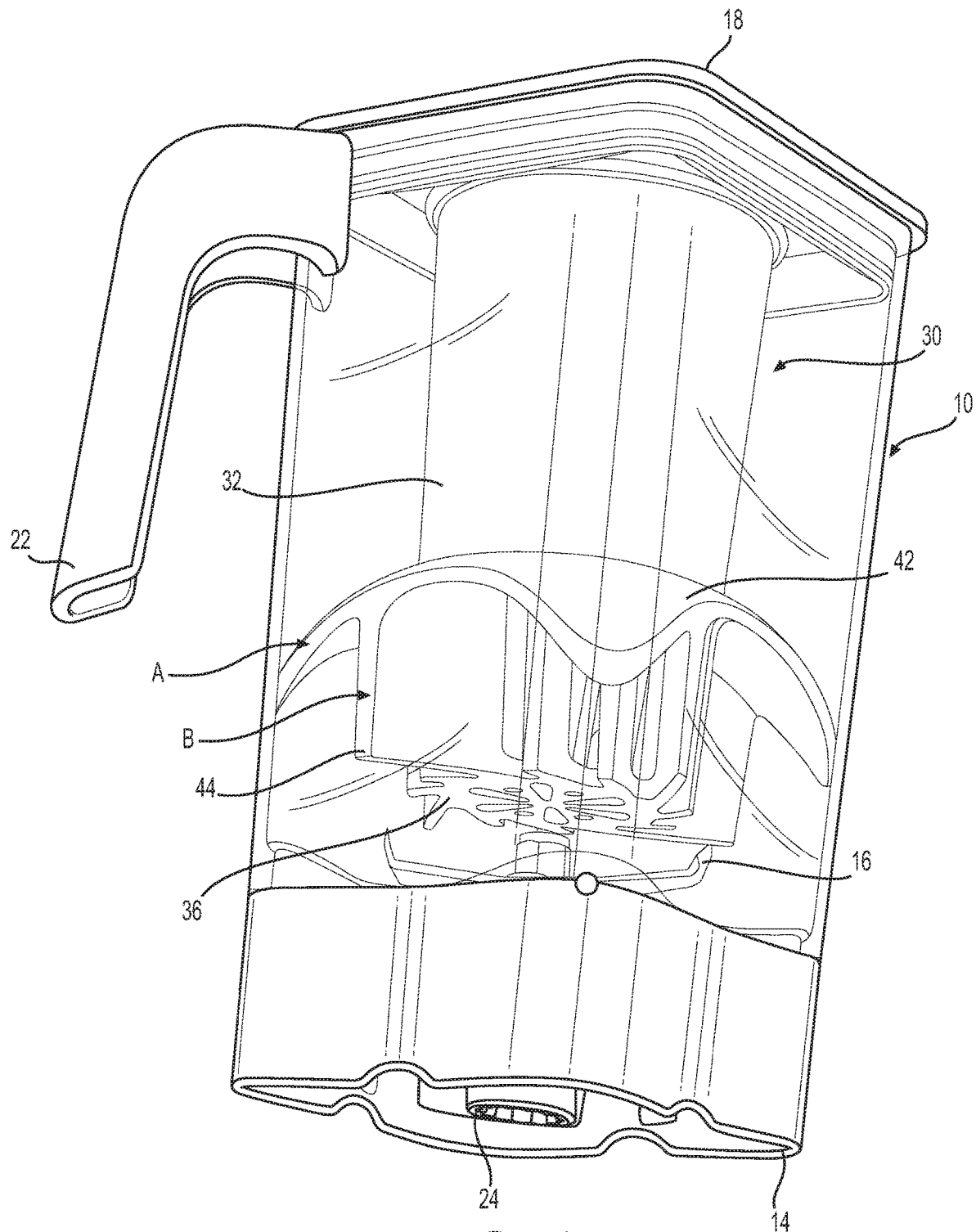
FIG. 2 is a bottom perspective view of the blender jar with insert of FIG. 1.
Figure 3:
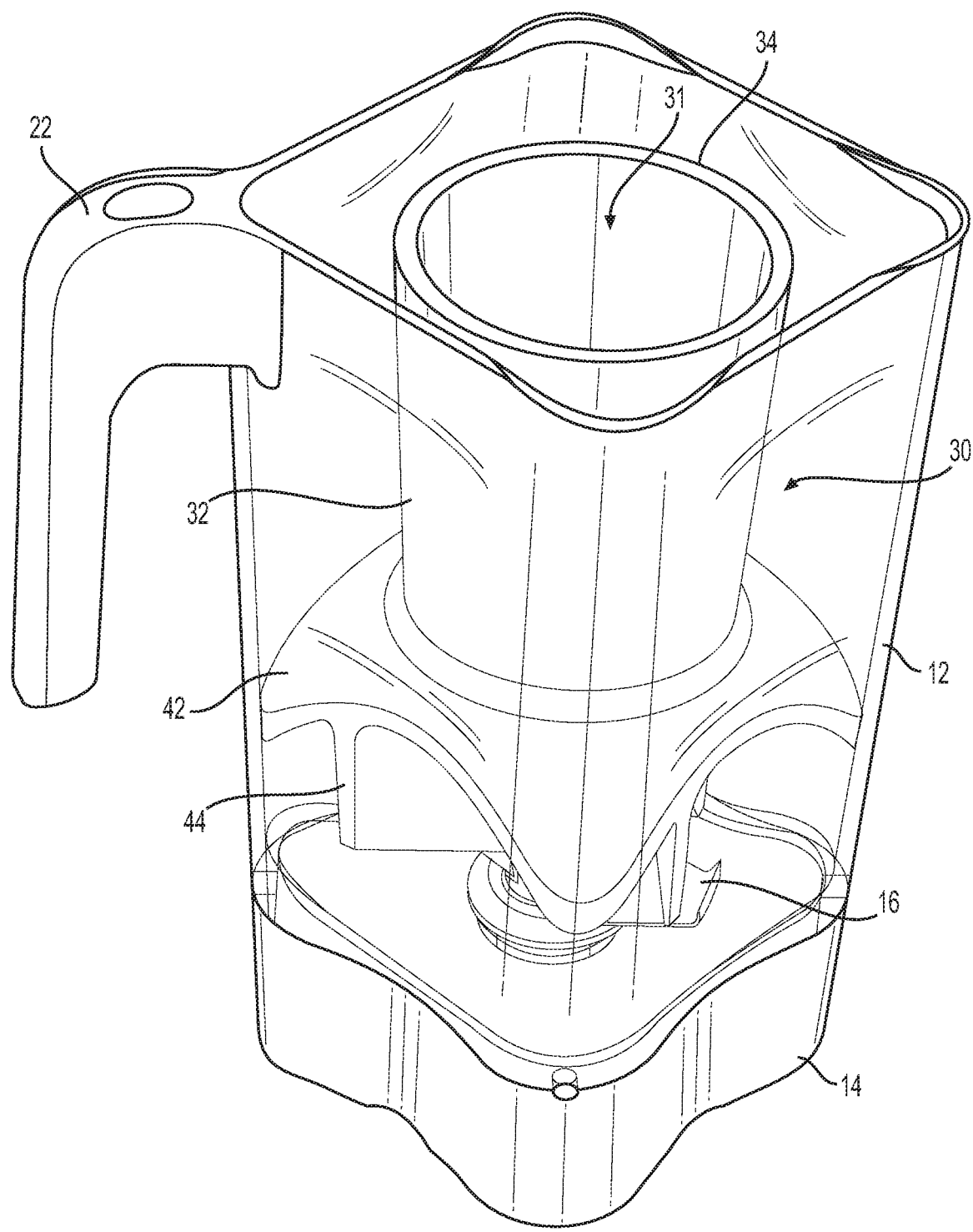
FIG. 3 is a top perspective view of the blender jar with insert of FIG. 1, with its lid removed.
Figure 4:
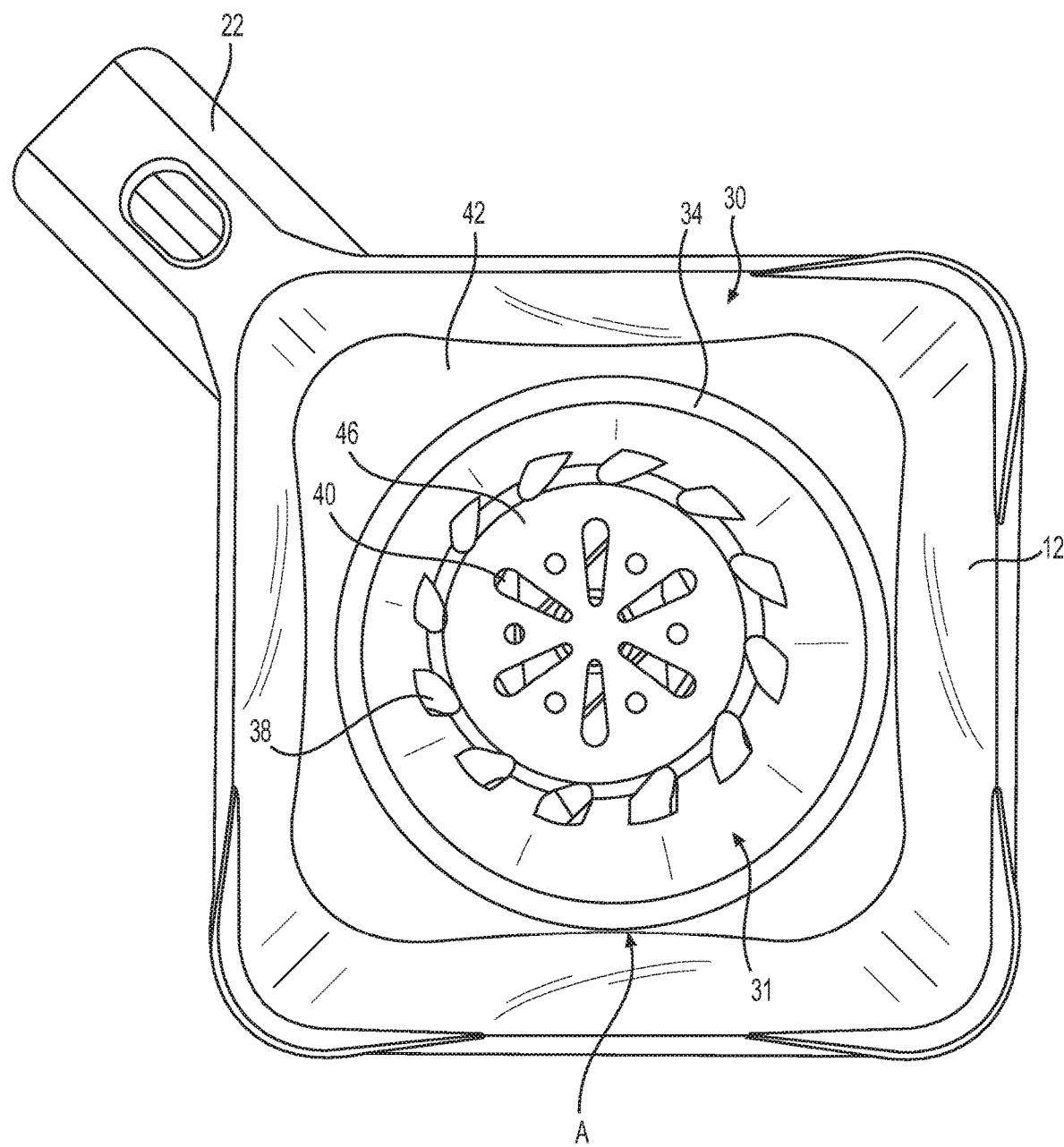
FIG. 4 is a top view of the blender jar with insert of FIG. 1, with its lid removed.
Figure 5:
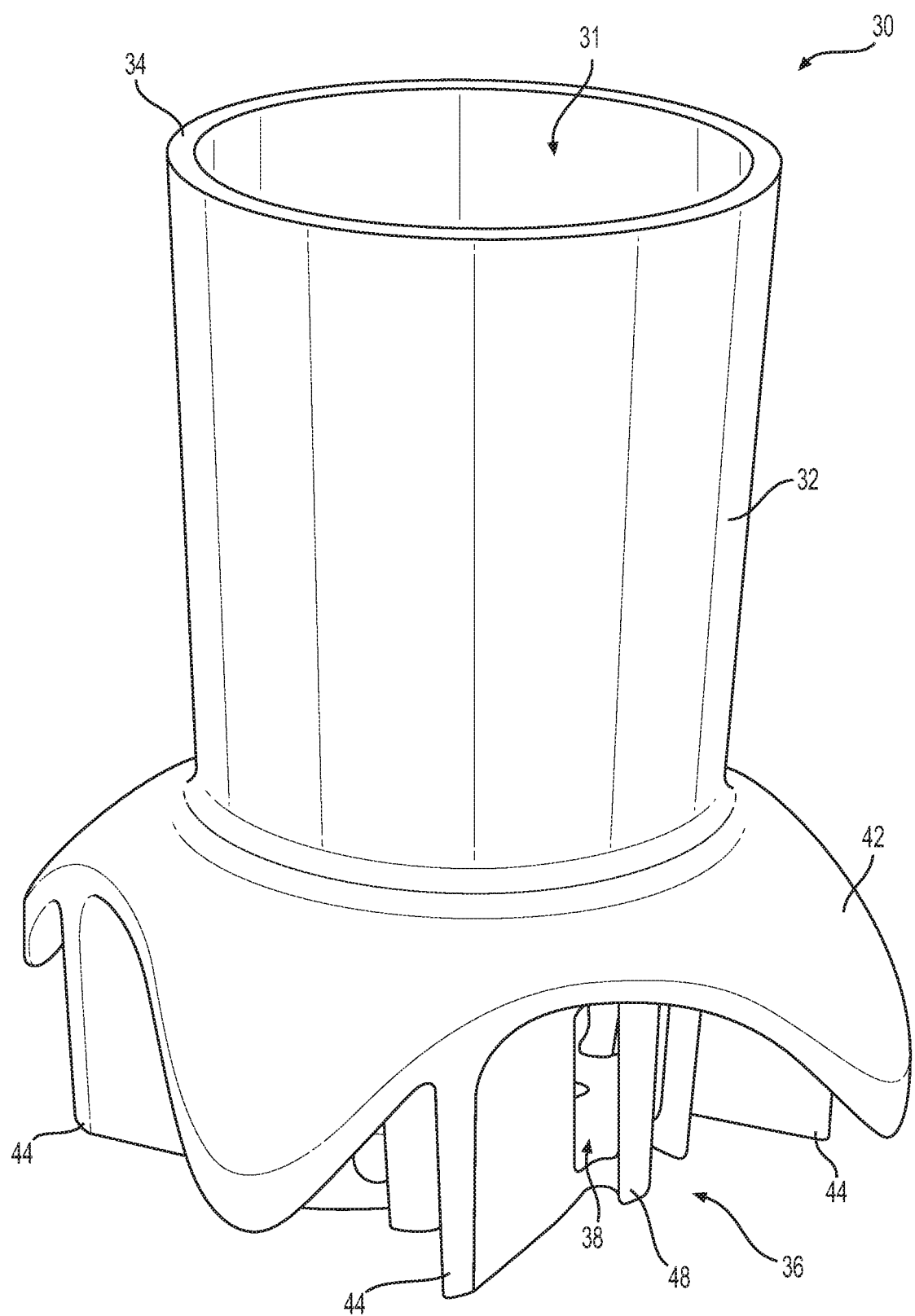
FIG. 5 is a top perspective view of the blender jar insert of FIG. 1 removed from the blender jar.
Figure 6:
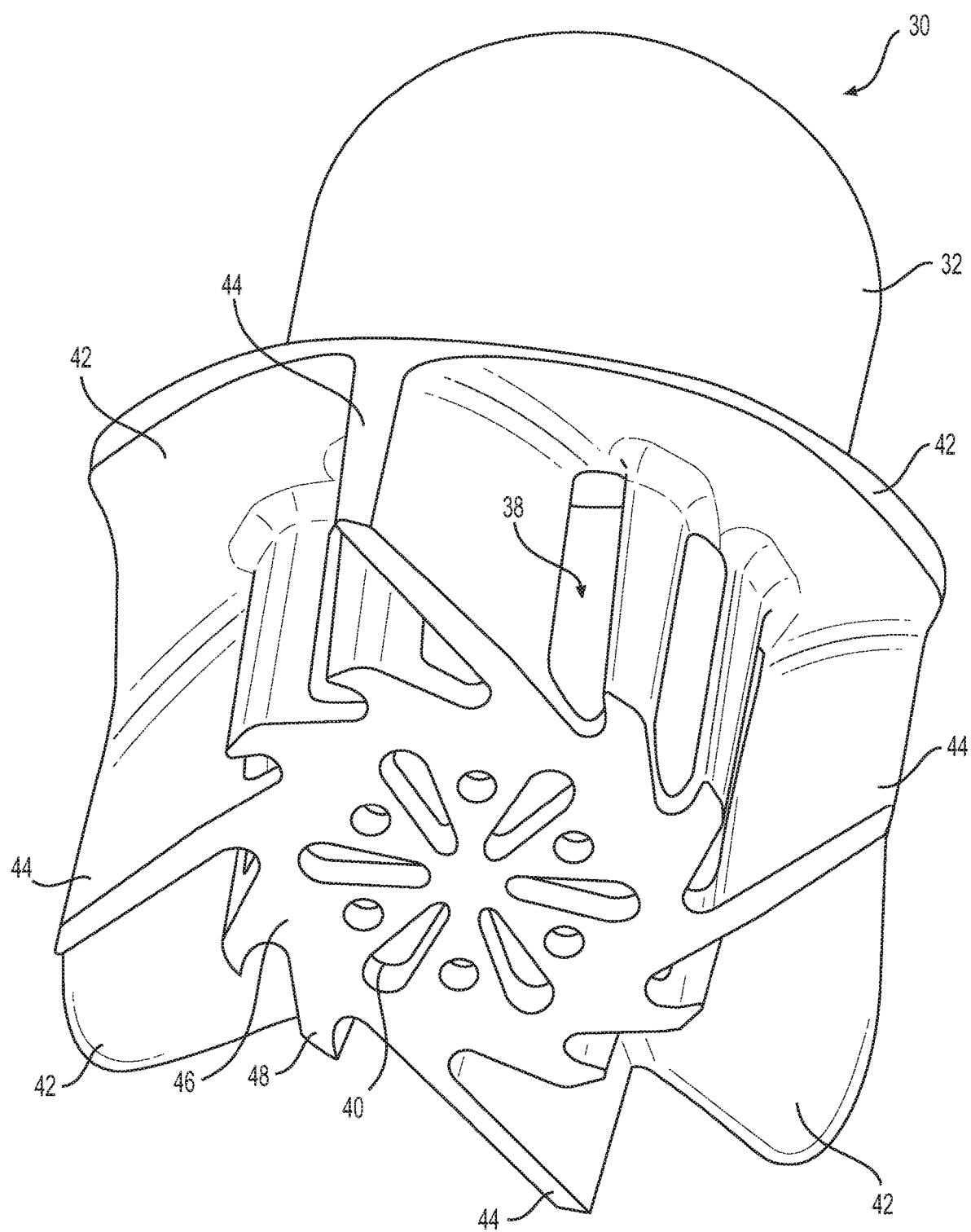
FIG. 6 is a bottom perspective view of the blender jar insert of FIG. 5.
Figure 7:
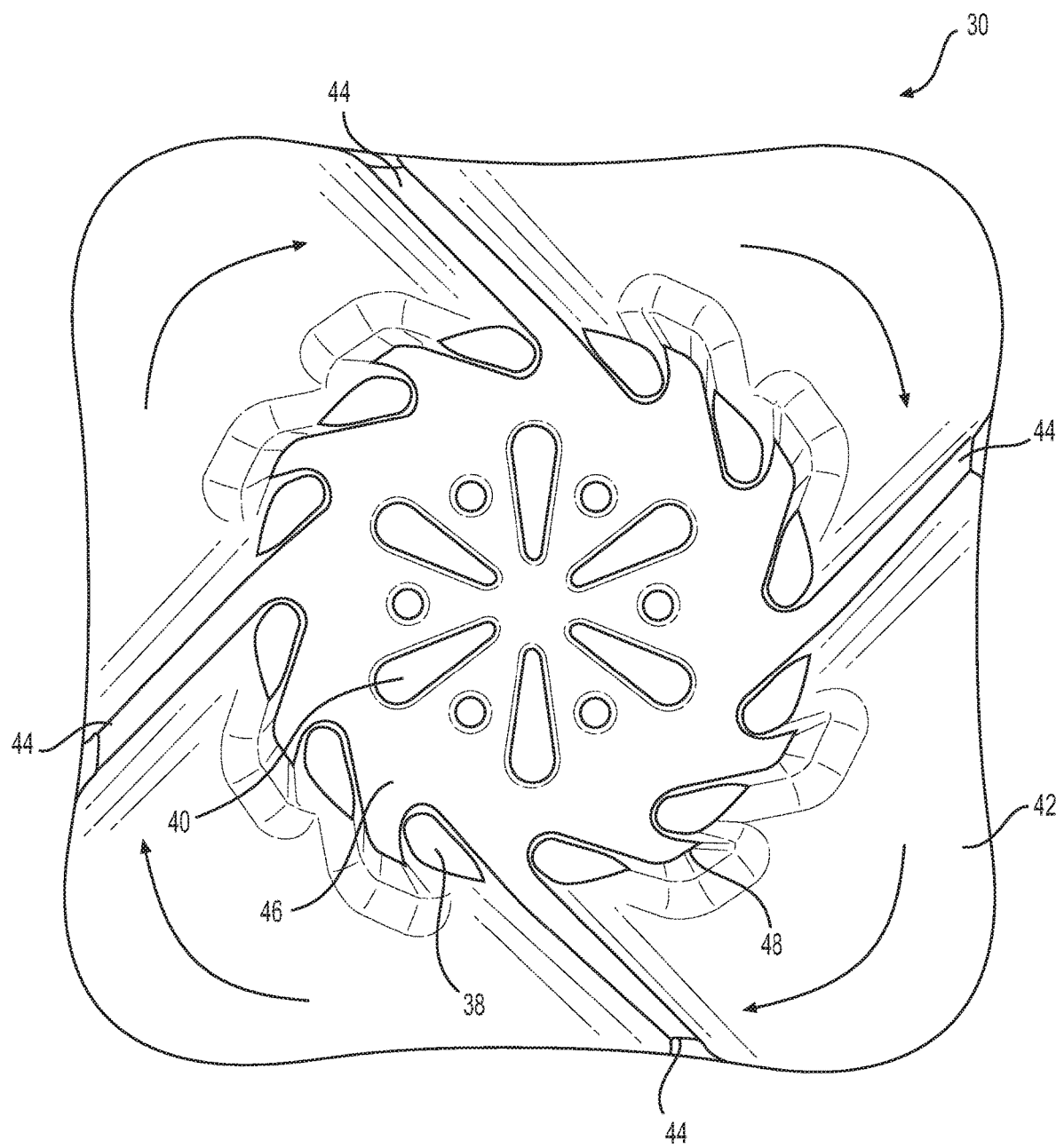
FIG. 7 is a bottom view of the blender jar insert of FIG. 5.

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout, FIGS. 1-12 illustrate a blender jar and blender jar insert in accordance with a preferred embodiment of the present disclosure. The blender jar 10 of embodiments of the present disclosure is selectively mountable to a blender base (not illustrated) enclosing a motor (not illustrated) in an operating configuration. The blender jar 10 has a container portion 12 for containing foodstuff to be blended, a bottom portion 14 for selectively mounting the blender jar to the blender base, an open top end with a lid 18 that is removably mountable to the jar to selectively close off the top end, a handle 22, and one or more selectively rotatable blades 16. The lid 18 has a removable center portion called a cap 20 which is selectively removable to reveal a smaller opening through which additional foodstuff may be added during the blending process. The blender base typically comprises a clutch coupling (not illustrated) that is rotated by the motor and that operatively engages with a coupling clutch 24 on the underside of the blender jar to cause blades 16 within the blender jar to rotate when the motor is activated.

The illustrated blender jar may be an off-the-shelf blender jar for which an insert of embodiments of the present disclosure has been designed and constructed to be insertable into the blender jar. Alternatively, the blender jar and insert may be specifically designed together to mate with each other.

As seen in the figures, the insert 30 is selectively insertable into the blender jar 10. When in the blender jar, the insert 30 is supported above the blades 16 such that the blades may rotate without contacting the insert. Two different mechanisms (described below) are illustrated herein for supporting the insert in the blender jar above the blades.

The insert is adapted to receive an infusible foodstuff, such as tea leaves (typically in a tea bag). With the insert in place in the blender jar along with a desired amount of water, the blender may be operated for a desired amount of time. The rotation of the blades agitates the water in the blender jar, increasing the speed of infusion of the infusible foodstuff into the water. When the desired amount of time has elapsed, the blender may be deactivated and the insert removed from the blender jar. Another foodstuff and/or ice may then be added into the water infused with the foodstuff in the blender jar, and the blender may be again activated for a desired amount of time. However, with the insert removed the blades are now able to blend all of the material in the blender jar. In this regard, embodiments of the present disclosure enable rapid steeping of tea or other infusible foodstuff and then blending of the steeped tea and one or more other ingredients to create specialty drinks without the use of two separate blenders.

The insert 30 comprises a tubular central body having an upper portion 32 and a lower portion 36 (the flange 42, described below, may be considered the boundary between the upper portion 32 and the lower portion 36, although the exact location of this boundary is typically not critical). The tubular central body is illustrated as generally cylindrical, but the tubular central body could have any other suitable shape (such as a rectangular tube with a square open top end). The wall of the central body defines a central chamber 31. A top rim 34 defines an open top end. A floor 46 at least partially closes off the bottom end of the central body. A plurality of openings 40 may be defined in the floor 46 and/or a plurality of openings 38 may be defined in the wall of the lower portion 36. An infusible foodstuff, such as tea in a tea bag, may be inserted into the central chamber 31 via the open top end defined by the top rim 34. It is preferable that the infusible foodstuff fall or be pushed by a user down into the lower portion 36 prior to the steeping process. The openings 40 defined in the floor 46 and/or the openings 38 defined in the wall of the lower portion 36 enable water in the blender jar to reach the infusible foodstuff in the lower portion 36 to enable steeping. The floor 46 must be solid enough to prevent the infusible foodstuff from contacting the rotating blade 16, but otherwise could have any suitable quantity and/or shape of openings (as another example, the floor could comprise a mesh screen). The floor is typically planar, as illustrated, but may have any other suitable contour. One or more bumps, ridges, or the like may be formed on the inside surface of the floor (i.e., the surface upon which the infusible foodstuff sits) to help the water to reach and surround the infusible foodstuff.

The lower portion 36 of the central body may comprise a plurality of scooped projections 48 (which may be elongated as illustrated, spanning from the bottom surface of the flange 42 to the floor 46), with each scooped projection 48 at least partially defining one of the respective openings 38 into the lower portion 36 of the central chamber. In the specific illustrated embodiment, the rotational direction of the blades 16 tends to cause any liquid within the blender jar to circulate in the direction illustrated by the arrows in FIG. 7. The scooped projections 48 are structured and positioned such that liquid circulating in the blender jar when the blades are selectively rotating is directed into the lower portion 36 through each respective opening 38.

The height of the central body may be selected such that the underside of the lid 18, when in place on the container portion 12, contacts the top rim 34. In this regard, the lid holds the insert 30 in position during operation of the blender. Without such contact between the lid and the top rim, the circulation of the liquid in the blender jar might tend to cause the insert 30 to undesirably be pushed upward.

The insert 30 further comprises a flange 42 projecting circumferentially outward from the central body. The purpose of the flange 42 is to deflect liquid back downward when the rotating blades 16 might tend to push the liquid upward, to help retain the liquid in the bottom of the container portion 12 where the liquid is able to contact the infusible foodstuff. The flange 42 may curve downward, forming an umbrella-like shape as illustrated (any other suitable shape or profile may be used). The flange may extend partly from the central body to the inner surface of the container portion, or the flange may extend fully from the central body to the inner surface of the container portion, when the insert 30 is in place in the blender jar. If the flange extends fully to the inner surface of the container portion, some or all of the outer edge of the flange may be in contact with the inner surface of the container portion when the insert 30 is in place in the blender jar. In this regard, the outer edge of the flange 42 has a profile that corresponds to a profile of a corresponding portion of an inner surface of the container portion 12 to enable contact between the entire outer edge of the flange 42 and the corresponding portions of the inner surface of the container portion 12. The correspondence of the profile of the outer edge of the flange 42 to the profile of the corresponding portion of the inner surface of the container portion 12 is indicated by arrow A in FIGS. 2 and 4. The closer the outer edge of the flange is to the inner surface of the container portion, and the more contact between the outer edge of the flange and the inner surface of the container portion, the more effectively the liquid will be deflected downward during operation of the blender.

The container portion 12 of the blender jar 10 has a small (about five degrees) inward slope from top to bottom. As the insert 30 is being placed into the container portion 12, at a specific point the contact between the outer edge of the flange (and/or the outer edge of the fins 44, described below) and the inner surface of the container portion 12 will prevent the insert 30 from going any further into the container portion 12 and will, in fact, support the insert 30 in the desired position in the container portion 12. The size of the flange and the size of the central body are selected such that the contact between the outer edge of the flange and the inner surface of the container portion enables the lower portion 36 of the central body to be positioned at a desired height above the blades 16.

The insert 30 may further comprise a plurality of fins 44 projecting outward from the lower portion 36 of the central body. Four fins 44 are illustrated, although more or fewer may be used. The fins may be spaced evenly around the perimeter of the lower portion 36, as illustrated, or may have some other spacing arrangement. The top end of each fin may abut the underside of the flange, and may be integral with the flange as illustrated. Each fin 44 may project outward from the lower portion 36 of the central body at an angle, as illustrated, such that liquid circulating in the container portion when the blades are selectively rotating (indicated by the arrows in FIG. 7) is directed toward the lower portion 36 of the central body. In the illustrated embodiments, this angle is about forty-five degrees, although any suitable angle may be used.

The profile of the outer end of each of the fins 44 may correspond to a profile of a corresponding portion of the inner surface of the container portion 12. The fins may extend partly from the central body to the inner surface of the container portion, or the fins may extend fully from the central body to the inner surface of the container portion. If the fins extend fully to the inner surface of the container portion, some or all of the outer edges of the fins may be in contact with the inner surface of the container portion when the insert 30 is in place in the blender jar. In this regard, the outer edge of each fin 44 has a profile that corresponds to a profile of a corresponding portion of an inner surface of the container portion 12 to enable contact between the entire outer edge of each flange 44 and the corresponding portions of the inner surface of the container portion 12. The correspondence of the profile of the outer edge of each fin 44 to the profile of the corresponding portion of the inner surface of the container portion 12 is indicated by arrow B in FIG. 2. The closer the outer edge of each fin is to the inner surface of the container portion, and the more contact between the outer edge of each fin and the inner surface of the container portion, the more effectively the liquid will be deflected directed toward the lower portion 36 of the central body. The fins 44 may be generally vertical, as illustrated, or alternatively the fins may be angled from vertical in a direction to direct liquid both inward and downward.

The blender jar insert 30 of FIGS. 1-7 is typically constructed as a single unitary component from any suitable strong, durable, and water-resistant material (such as any suitable plastic).

Figure 8:
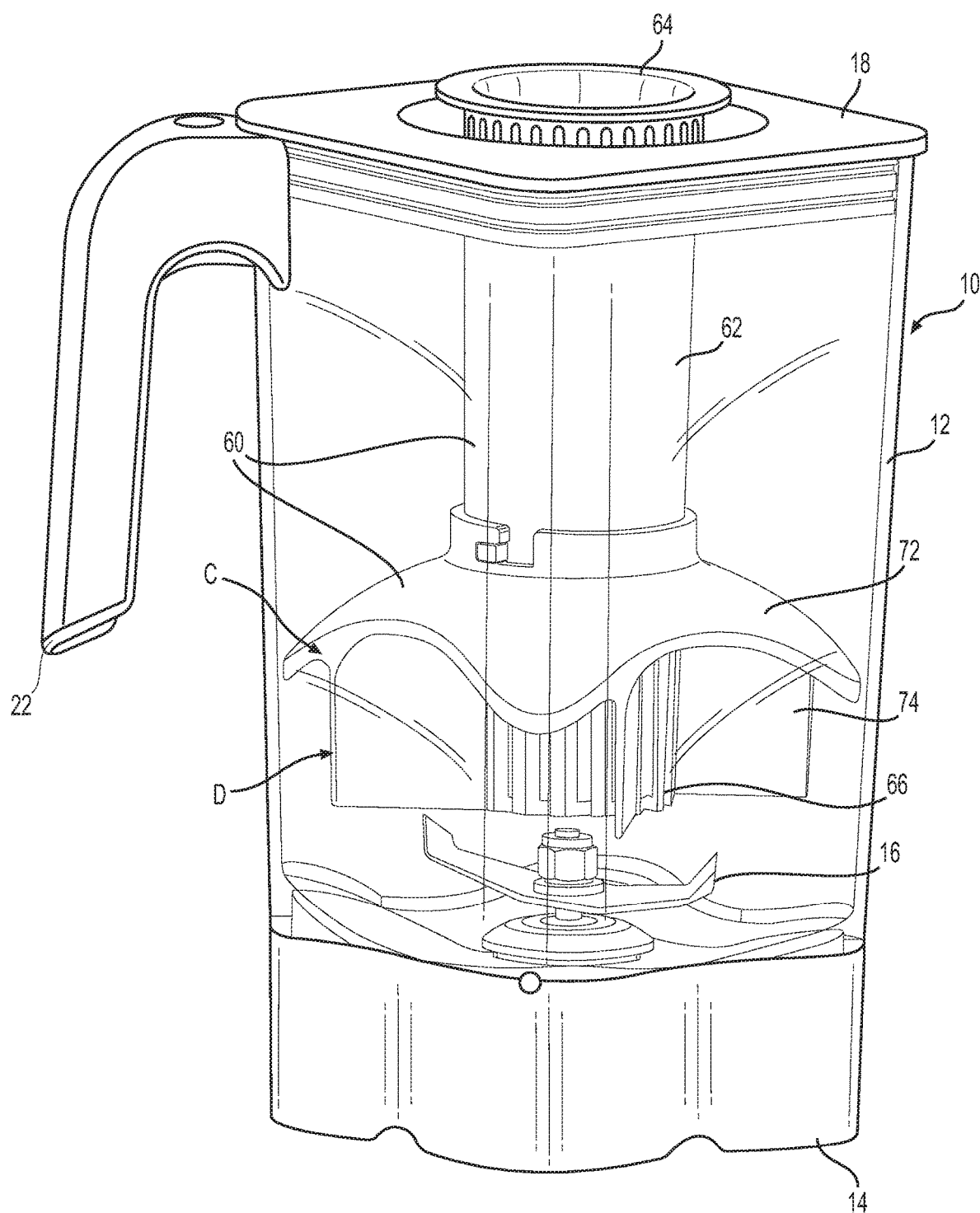
FIG. 8 a top perspective view of a blender jar with insert, according to an alternative embodiment of the present disclosure.

Referring now to FIGS. 8-12, a blender jar and insert is illustrated according to an alternative embodiment of the present disclosure. The blender jar 10 of FIG. 8 is identical to the blender jar of FIGS. 1-4, in that the blender jar 10 of FIG. 8 has a container portion 12 for containing foodstuff to be blended, a bottom portion 14 for selectively mounting the blender jar to the blender base, an open top end with a lid 18 that is removably mountable to the jar to selectively close off the top end, a handle 22, and one or more selectively rotatable blades 16. The lid 18 has a removable center portion called a cap (not illustrated in FIG. 8) which is selectively removable to reveal a smaller opening through which additional foodstuff may be added during the blending process. This opening in the lid 18 is used to support the insert 60, as described below.

Figure 9:
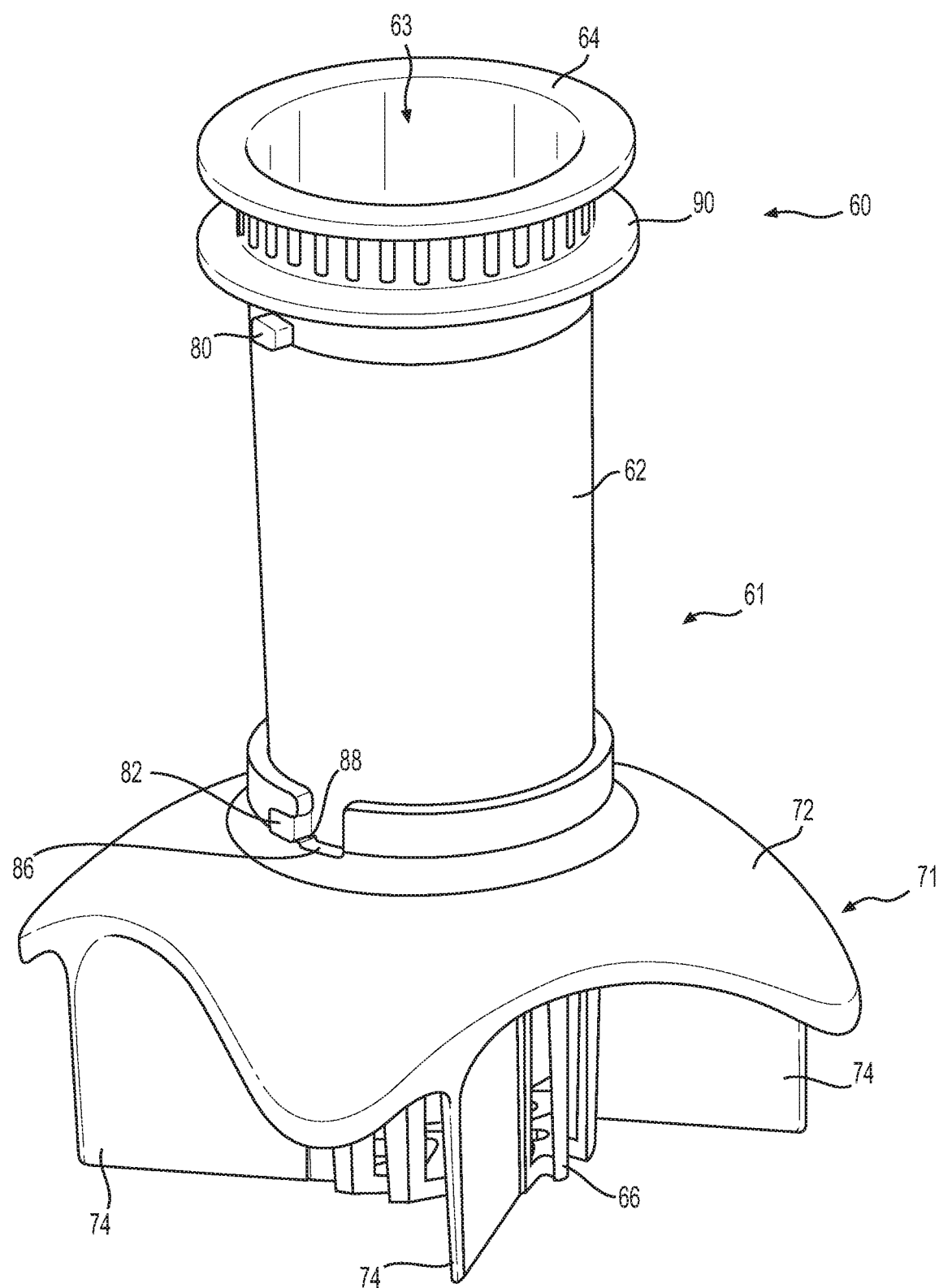
FIG. 9 is a top perspective view of the blender jar insert of FIG. 8, removed from the blender jar.
Figure 10:
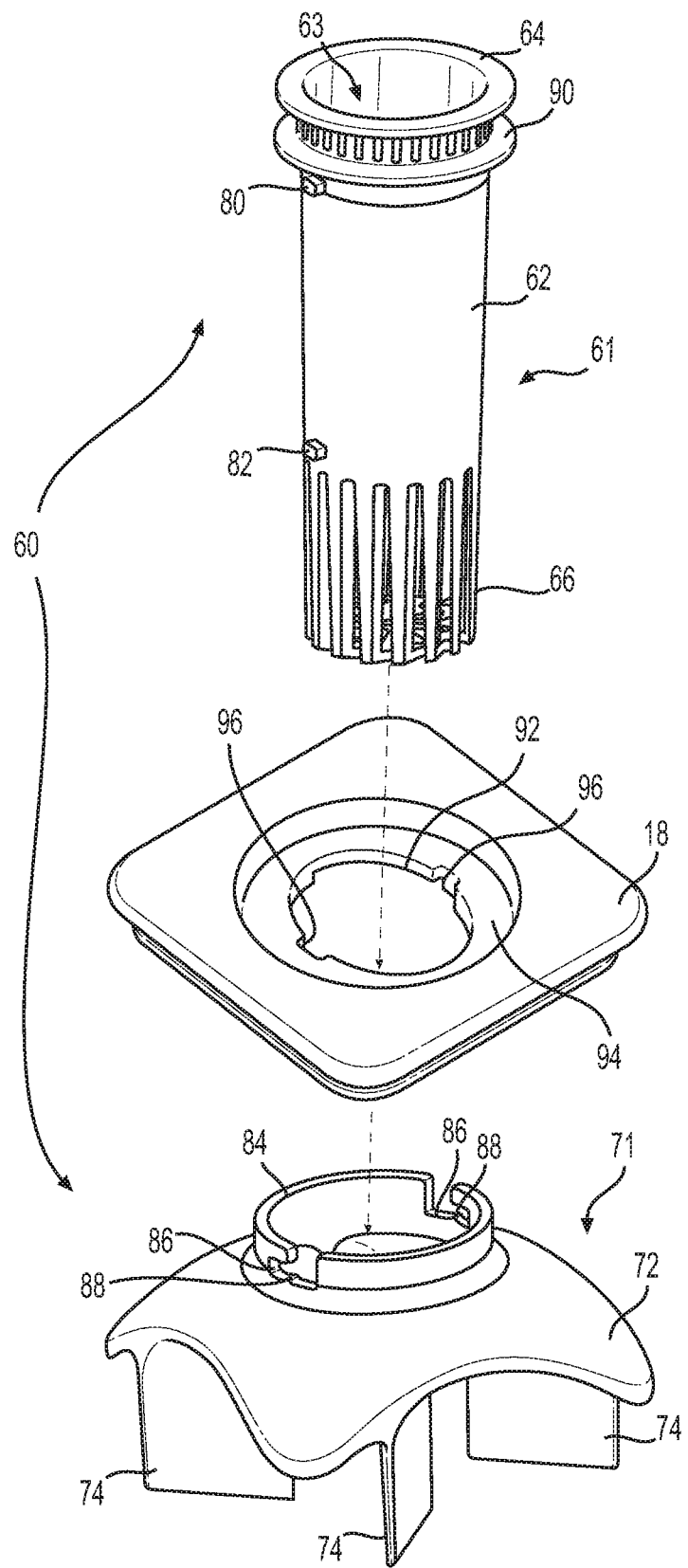
FIG. 10 is an exploded perspective view of the blender jar insert of FIG. 9.
Figure 11:
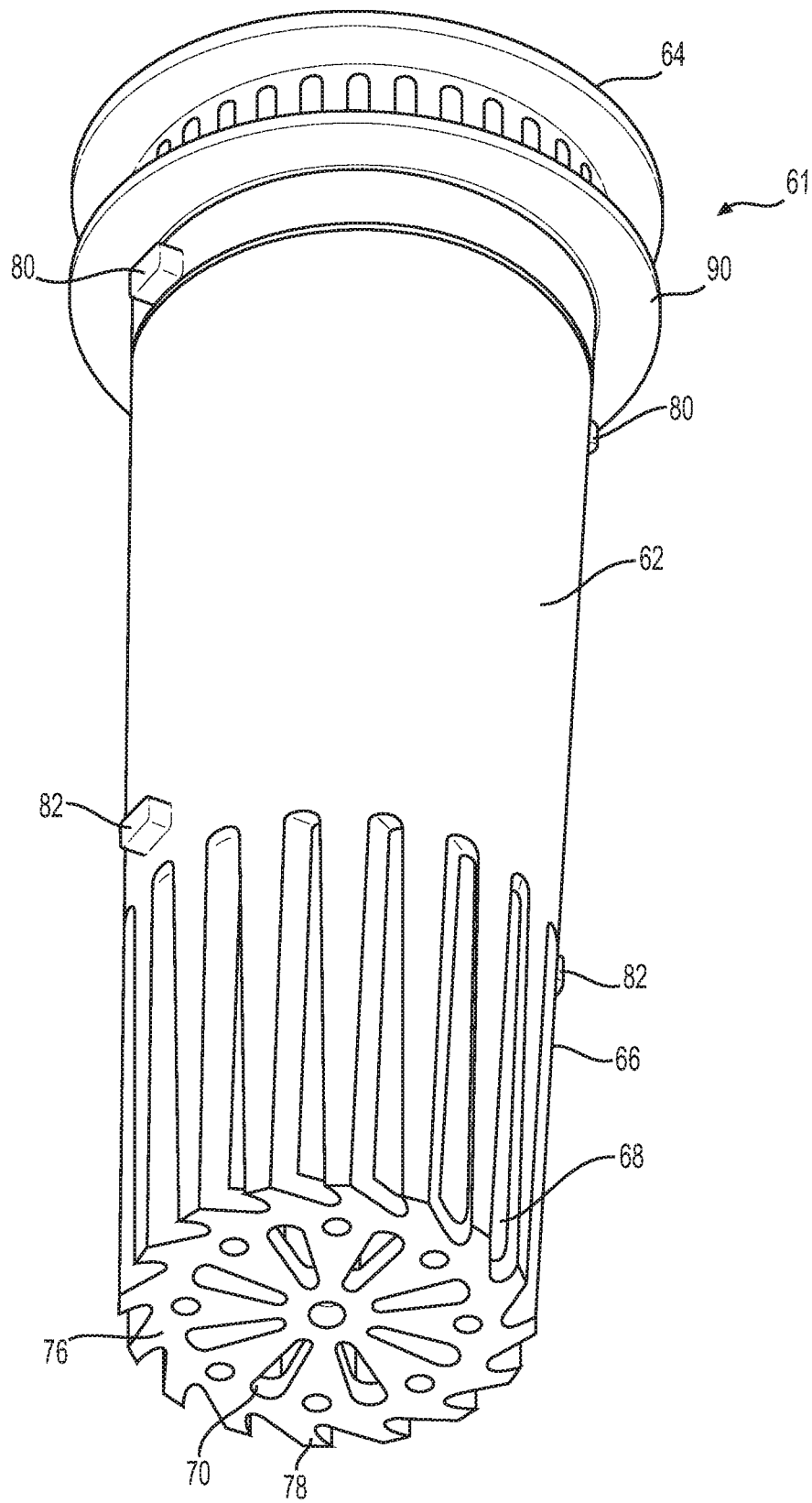
FIG. 11 is a bottom perspective view of the central body portion of the blender jar insert of FIG. 8.
Figure 12:
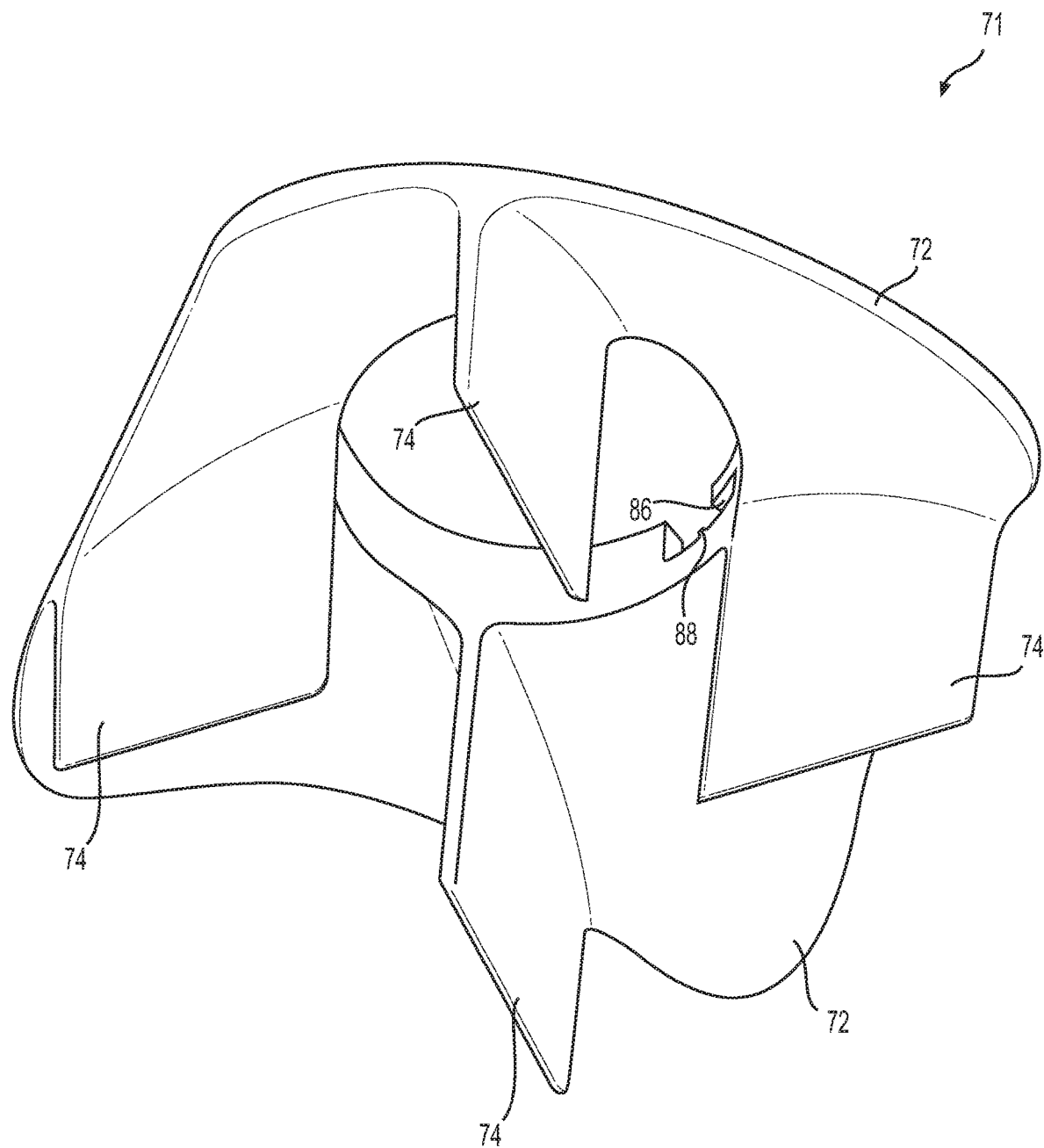
FIG. 12 is a bottom perspective view of the flange and fin portion of the blender jar insert of FIG. 8.

Unlike the blender jar insert 30 of FIGS. 1-7, the blender jar insert 60 of FIGS. 8-12 is constructed of two separate components that are selectively matable as described below. FIGS. 8 and 9 show the two components of the blender jar insert 60 in the mated arrangement, while FIGS. 10-12 show the components of the blender jar insert 60 separated. The blender jar insert 60 comprises a tubular central body 61 and a separable flange/fin portion 71. The tubular central body 61 has an upper portion 62 and a lower portion 66 (when mated, the flange 72, described below, may be considered the boundary between the upper portion 62 and the lower portion 66, although the exact location of this boundary is typically not critical). The tubular central body is illustrated as generally cylindrical, but the tubular central body could have any other suitable shape (such as a rectangular tube with a square open top end). The wall of the central body defines a central chamber 63. A top rim 64 defines an open top end. A floor 76 at least partially closes off the bottom end of the central body 61. A plurality of openings 70 may be defined in the floor 76 and/or a plurality of openings 68 may be defined in the wall of the lower portion 66. An infusible foodstuff, such as tea in a tea bag, may be inserted into the central chamber 63 via the open top end defined by the top rim 64. The lower portion 66 of the central body may comprise a plurality of scooped projections 78, with each scooped projection 78 at least partially defining one of the respective openings 68 into the lower portion 66 of the central chamber.

The separable flange/fin portion 71 of the blender jar insert 60 comprises flange 72 that projects circumferentially outward from the central body 61 when the two components are mated. The flange 72 may curve downward, forming an umbrella-like shape as illustrated (any other suitable shape or profile may be used). The flange may extend partly from the central body to the inner surface of the container portion, or the flange may extend fully from the central body to the inner surface of the container portion, when the insert 60 is in place in the blender jar. If the flange extends fully to the inner surface of the container portion, some or all of the outer edge of the flange may be in contact with the inner surface of the container portion when the insert 60 is in place in the blender jar. In this regard, the outer edge of the flange 72 has a profile that corresponds to a profile of a corresponding portion of an inner surface of the container portion 12 to enable contact between the entire outer edge of the flange 72 and the corresponding portions of the inner surface of the container portion 12. The correspondence of the profile of the outer edge of the flange 72 to the profile of the corresponding portion of the inner surface of the container portion 12 is indicated by arrow C in FIG. 8.

The separable flange/fin portion 71 of the blender jar insert 60 further comprises a plurality of fins 74 that project circumferentially outward from the central body 61 when the two components are mated. Four fins 74 are illustrated, although more or fewer may be used. The fins may be spaced evenly around the perimeter of the lower portion 66 when the two components are mated, as illustrated, or may have some other spacing arrangement. The top end of each fin may abut the underside of the flange, and may be integral with the flange as illustrated. Each fin 74 may project outward from the lower portion 36 of the central body at an angle when the two components are mated, as illustrated, such that liquid circulating in the container portion when the blades are selectively rotating (indicated by the arrows in FIG. 7) is directed toward the lower portion 66 of the central body.

The profile of the outer end of each of the fins 74 may correspond to a profile of a corresponding portion of the inner surface of the container portion 12. The fins may extend partly from the central body to the inner surface of the container portion when the two components are mated, or the fins may extend fully from the central body to the inner surface of the container portion. If the fins extend fully to the inner surface of the container portion, some or all of the outer edges of the fins may be in contact with the inner surface of the container portion when the insert 60 is in place in the blender jar. In this regard, the outer edge of each fin 74 has a profile that corresponds to a profile of a corresponding portion of an inner surface of the container portion 12 to enable contact between the entire outer edge of each flange 74 and the corresponding portions of the inner surface of the container portion 12. The correspondence of the profile of the outer edge of each fin 74 to the profile of the corresponding portion of the inner surface of the container portion 12 is indicated by arrow D in FIG. 8. The fins 74 may be generally vertical, as illustrated, or alternatively the fins may be angled from vertical in a direction to direct liquid both inward and downward.

The separable flange/fin portion 71 of the blender jar insert 60 further comprises a collar 84 for mating the flange/fin portion 71 to the central body 61. The collar 84 has two opposing notches 86 (more or fewer notches may be used). The central body 61 and the flange/fin portion 71 are mated by inserting the bottom end of the central body 61 through the collar 84 until each notch 86 receives a corresponding tab 82 protruding from the exterior surface of the central body 61. The central body 61 is then rotated slightly such that each tab 82 moves into the locking portion of the corresponding notch 86 (this twist-locked position is illustrated in FIG. 9). A small protrusion 88 within each notch 86 helps retain the tabs 82 in the locking portion.

As is conventionally known, the lid 18 comprises a central hole 92 surrounded by a recessed shoulder 94 with two opposing notches 96 for selectively receiving the removable center portion called a cap (not illustrated in FIG. 8, but illustrated in FIG. 1). The central body 61 of insert 60 further comprises a mounting flange 90 spaced apart from and below the top rim 64. Prior to mating the central body 61 and the flange/fin portion 71, the lower end of the central body 61 is inserted through the hole 92 in the lid 18 until each lid notch 96 receives a corresponding tab 80 protruding from the exterior surface of the central body 61 just below the mounting flange 90. The central body 61 is then rotated slightly such that the shoulder 94 is sandwiched between each tab 80 and the mounting flange 90. In this regard, the central body 61 is twist-locked to the lid 18. The central body 61 and the flange/fin portion 71 may then be mated as described above. The mating position and sequence of the central body 61, the lid 18, and the flange/fin portion 71 are illustrated by the dashed line in FIG. 10.

The height of the central body may be selected such that, when the central body 61, the lid 18, and the flange/fin portion 71 are mated and the lid 18 is secured to the blender jar 10, the central body 61 and the flange/fin portion 71 are at the desired position within the container portion 12 and the insert 60 is held in position during operation of the blender.

The blender jar insert 60 of FIGS. 8-12 may be constructed from any suitable strong, durable, and water-resistant material (such as any suitable plastic).

In operation, a blender jar insert as described above is inserted into a blender jar as described above, a desired amount of an infusible foodstuff is put into the lower portion of the central body of the insert, a desired amount of water (or other liquid) is put into the blender jar, and the blender motor is activated for a desired amount of time to steep the infusible foodstuff. After the motor is run for the desired amount of time, the insert is removed from the blender jar and a desired amount of another foodstuff and/or ice is added into the blender jar, and the blender motor is again activating for a desired amount of time.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

That which is claimed:

1. A blender jar comprising:
   a container portion defining a blending chamber and having an open top end;

a lid for selectively closing off the open top end of the container portion;
one or more selectively rotatable blades extending into the blending chamber; and
an insert selectively insertable into the blending chamber, the insert comprising:
a tubular central body having (i) a side wall defining a central chamber and an open top end and (ii) a floor at least partially closing off a bottom end of the central body, at least one of the floor and a lower portion of the central body having a plurality of holes defined therein;
a flange projecting circumferentially outward from the central body, an outer edge of the flange having a profile that corresponds to a profile of a corresponding portion of an inner surface of the container portion wherein the outer edge of the flange is adapted to be in contact with the corresponding portion of the inner surface of the container when the insert is inserted into the container portion; and
a plurality of fins projecting outward from the lower portion of the central body.

2. The blender jar of claim 1, wherein a size of the flange is selected such that the contact between the outer edge of the flange and the inner surface of the container portion enables the insert to be supported above the blades.

3. The blender jar of claim 1, wherein a profile of an outer end of each of the plurality of fins corresponds to the profile of a corresponding portion of the inner surface of the container portion.

4. The blender jar of claim 3, wherein the outer edge of each of the plurality of fins is adapted to be in contact with the corresponding portion of the inner surface of the container portion when the insert is inserted in the container portion.

5. The blender jar of claim 1, wherein a top end of each fin abuts an underside of the flange.

6. The blender jar of claim 1, wherein each fin projects outward from the lower portion of the central body at an angle such that liquid circulating in the container portion when the blades are selectively rotating is directed toward the lower portion of the central body.

7. The blender jar of claim 1, wherein the lower portion of the central body comprises a plurality of scooped projections, each projection at least partially defining an opening into the central chamber, each projection positioned such that liquid circulating in the container portion when the blades are selectively rotating is directed into each respective opening.

8. The blender jar of claim 1, wherein the flange curves downward from the central body toward the inner surface of the container portion.

9. The blender jar of claim 1, wherein the central body is selectively separable from the flange and the plurality of fins.

10. The blender jar of claim 1, wherein an upper end of the central body is selectively engageable with the lid such that the insert is supported above the blades by the lid.

11. The blender jar insert of claim 1, wherein the central body is selectively separable from the flange and the plurality of fins.

12. The blender jar insert of claim 1, wherein an upper end of the central body is adapted to be selectively engageable with a lid of the blender jar such that the insert is adapted to be supported above the blades by the lid.

13. A blender jar insert adapted to be removably insertable into a blender jar, the blender jar insert comprising:
a tubular central body having (i) a side wall defining a central chamber and an open top end and (ii) a floor at least partially closing off a bottom end of the central body, one or both of the floor and a lower portion of the central body having a plurality of holes defined therein;
a flange projecting circumferentially outward from the central body, an outer edge of the flange having a profile that is adapted to correspond to a profile of a corresponding portion of an inner surface of the blender jar into which the blender jar insert is adapted to be removably insertable wherein the outer edge of the glange is adapted to be in contact with the corresponding portion of the inner surface of the blender jar when the insert is inserted into the blender jar; and
a plurality of fins projecting outward from the lower portion of the central body.

14. The blender jar insert of claim 13, wherein a size of the flange is selected such that the contact between the outer edge of the flange and the inner surface of the blender jar enables the insert to be supported above one or more blades of the blender jar.

15. The blender jar insert of claim 13, wherein a profile of an outer end of each of the plurality of fins is adapted to correspond to the profile of a corresponding portion of the inner surface of the blender jar into which the blender jar insert is adapted to be removably insertable.

16. The blender jar insert of claim 15, wherein the outer edge of each of the plurality of fins is adapted to be in contact with the corresponding portion of the inner surface of the blender jar when the insert is inserted in the blender jar.

17. The blender jar insert of claim 13, wherein a top end of each fin abuts an underside of the flange.

18. The blender jar insert of claim 13, wherein each fin projects outward from the lower portion of the central body at an angle such that the fins are adapted to direct liquid circulating in the blender jar toward the lower portion of the central body.

19. The blender jar insert of claim 13, wherein the lower portion of the central body comprises a plurality of scooped projections, each projection at least partially defining an opening into the central chamber, the projections positioned such that each projection is adapted to direct liquid circulating in the blender jar into a respective opening.

20. The blender jar insert of claim 13, wherein the flange curves downward from the central body.

* * * * *